United States Patent
Heim et al.

(10) Patent No.: US 8,685,127 B2
(45) Date of Patent: Apr. 1, 2014

(54) COMPACT FILTER, METHOD FOR PRODUCING A COMPACT FILTER, AND FILTER MEDIUM

(75) Inventors: Michael Heim, Freiberg a.N. (DE); Thomas Sieber, Marklkofen (DE); Josef Rohrmeier, Laberweinting (DE); Klaus Gehwolf, Mamming (DE); Joachim-Paul Krieger, Reisbach (DE); Sven Epli, Heilbronn (DE); Tanja Majer, Ingersheim (DE); Andrés Moreno Linares, Sindelfingen (DE); Jobst Eisengraeber-Pabst, Benningen a.N. (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/495,276

(22) Filed: Jun. 13, 2012

(65) Prior Publication Data

US 2012/0279186 A1 Nov. 8, 2012

Related U.S. Application Data

(63) Continuation of application No. PCT/EP2010/069270, filed on Dec. 9, 2010.

(30) Foreign Application Priority Data

Dec. 14, 2009 (DE) .......................... 10 2009 058 067

(51) Int. Cl.
*B01D 49/00* (2006.01)
*B01D 59/00* (2006.01)
*B01D 39/06* (2006.01)
*B01D 39/14* (2006.01)
*B01D 24/00* (2006.01)
*B01D 50/00* (2006.01)
*B01D 46/00* (2006.01)

(52) U.S. Cl.
USPC .................. 55/486; 55/522; 55/523; 55/524; 55/330; 55/482; 55/502; 422/169; 422/170; 422/171; 422/172; 422/179; 422/180; 422/181; 422/182; 95/273

(58) Field of Classification Search
USPC ................... 55/486, 522–524, 330, 482, 502; 95/273; 422/169–172, 177–182, 422/177–172
See application file for complete search history.

(56) References Cited

U.S. PATENT DOCUMENTS 6,155,432 A * 12/2000 Wilson et al. ................. 210/505
6,321,915 B1 * 11/2001 Wilson et al. ................. 210/505

(Continued)

FOREIGN PATENT DOCUMENTS

| DE | 102008043334 | 5/2009 |
|---|---|---|
| WO | WO2005058461 | 6/2005 |
| WO | WO2007035802 | 3/2007 |

OTHER PUBLICATIONS

PCT ISA 210 search report of PCT/EP2010/069270.

*Primary Examiner* — Amber Orlando
(74) *Attorney, Agent, or Firm* — James Hasselbeck (57) ABSTRACT

A compact filter has a compact filter element for exchangeable use in a filter housing and the compact filter element has a filter body of a web-shaped filter medium. The web-shaped filter medium has at least one flat filter medium web and one corrugated filter medium web that are placed onto each other and at least partially connected to each other by ultrasonic welding. At least one of the flat and corrugated filter medium webs is a composite filter medium web of at least two components, wherein at least one component is a synthetic material and one component is a non-synthetic material. The non-synthetic material is a plant-derived material and forms a support of the composite filter medium web and the synthetic material is a synthetic layer applied on the support.

10 Claims, 5 Drawing Sheets

(56) References Cited

U.S. PATENT DOCUMENTS

| | | |
|---|---|---|
| 2004/0134353 A1* | 7/2004 | Gillingham et al. ............ 95/273 |
| 2004/0255783 A1* | 12/2004 | Graham et al. .................. 96/69 |
| 2005/0183405 A1 | 8/2005 | Gillingham |
| 2006/0042209 A1* | 3/2006 | Dallas et al. ................... 55/524 |
| 2008/0060328 A1* | 3/2008 | Devine ........................... 55/486 |
| 2008/0209874 A1* | 9/2008 | Gieseke et al. ................. 55/498 |
| 2008/0250766 A1* | 10/2008 | Schrage et al. ................. 55/498 |
| 2008/0318024 A1 | 12/2008 | Angadjivand |
| 2009/0043273 A1* | 2/2009 | Carlucci et al. ............... 604/370 |
| 2009/0120048 A1* | 5/2009 | Wertz et al. ..................... 55/521 |
| 2009/0293279 A1* | 12/2009 | Sebastian et al. .......... 29/896.62 |

\* cited by examiner

COMPACT FILTER, METHOD FOR PRODUCING A COMPACT FILTER, AND FILTER MEDIUM

CROSS-REFERENCE TO RELATED APPLICATIONS

This application is a continuation application of international application No. PCT/EP2010/069270 having an international filing date of 9 Dec. 2010 and designating the United States, the international application claiming a priority date of 14 Dec. 2009, based on prior filed German patent application No. 10 2009 058 067.0, the entire contents of the aforesaid international application and the aforesaid German patent application being incorporated herein by reference.

BACKGROUND OF THE INVENTION

The invention concerns a compact filter, in particular a compact air filter for motor vehicles, comprising a compact filter element for exchangeable use in a filter housing, wherein the compact filter element comprises a filter body of web-shaped filter medium in which at least one flat filter medium web and one corrugated filter medium web are placed on each other and are at least partially connected to each other across partial areas by means of ultrasonic welding.

The invention concerns moreover a method for producing a compact filter, in particular a compact air filter for motor vehicles, comprising a compact filter element for exchangeable use in a filter housing in which a filter body of the compact filter element is made from web-shaped filter medium, wherein at least one flat filter medium web and one corrugated filter medium web are placed on each other and are at least partially connected to each other across partial areas by means of ultrasonic welding.

The invention concerns moreover a filter medium, in particular a web-shaped filter medium, in particular a filter body of a compact filter element, preferably for exchangeable use in a filter housing of a compact filter, in particular a compact air filter for motor vehicles, in which at least one flat filter medium web and one corrugated filter medium web are placed on each other and are at least partially connected to each other across partial areas by means of ultrasonic welding.

When filtering air, so-called compact filters are widely used that are in particular formed of layered filter paper. A corrugated filter paper web is attached to a flat filter paper web. The thus formed semi-finished product is wound to a filter body or stacked, as a result of which a plurality of parallel extending gas passages are created. These gas passages are closed alternatingly by plugs. Incoming air flows from the raw side (unfiltered side) into the gas passages open at the inlet side and is forced by the plugs at the outlet side to pass through the filter walls into the neighboring gas passages. From here, the filtered air flows through the gas passages that are open at the outlet side to the clean side (filtered side) of the filter.

WO 2007/035802 A1 discloses a filter and a method for producing such a filter. The filter is made by winding a web-shaped filter medium to a coil. The filter medium is formed of a flat filter medium web and a corrugated filter medium web that are attached to each other by means of ultrasonic welding. The filter webs are made of polyester nonwoven.

The invention has the object to design a compact filter, a filter element, and a method of the aforementioned kind in such a way that a filter with optimal filtering action and an optimal service life can be realized in a simple and reliable way.

SUMMARY OF THE INVENTION

In accordance with the present invention, this is achieved in that at least one of the (flat and corrugated) filter medium webs is comprised of a composite of at least two components, wherein at least one of the components is a synthetic material and at least one of the components is a non-synthetic material.

According to the invention, at least one of the filter medium webs is therefore at least of a two-layer configuration of a synthetic material with a non-synthetic material. In this way, the advantages of a synthetic filter material are combined with the advantages of a non-synthetic filter material. Synthetic filter materials can be fused or welded to each other in a simple way. Use of a separate adhesive for connecting the filter medium webs is not required and this reduces the material expenditure and the related costs. Moreover, the risk of local constriction in the passages formed between the corrugated filter medium web and the flat filter medium web is reduced; such constrictions are produced in prior art filters when manufacturing the semi-finished product with adhesive beads of hotmelt that are applied onto the flat filter medium web in the longitudinal direction of the web. Pressure losses in the passages are thus minimized by the invention.

When fusing the semi-finished products at the peaks of the corrugations of the corrugated filter medium web, the passages remain free or unobstructed. A further advantage is that the size and shape of the synthetic fibers and the layer thicknesses of synthetic layers can be predetermined in a simple and exact way. With non-synthetic materials, on the other hand, it is advantageously possible to create dense filter media with fine pores with which even smallest particles can be filtered out of the fluid to be filtered. The composite of synthetic material and non-synthetic material increases advantageously the strength and stability of the semi-finished product in comparison to conventional filter medium webs. For example, in particular layer detachment or layer separation in the semi-finished product, which is referred to as telescoping, is prevented. When using the compact filters known from the prior art in vehicles, such layer separation can happen as a result of the vibrations that occur when operating vehicles. Layer separations may lead to failure or malfunction of the compact filter. Advantageously, the non-synthetic material can be cellulose. Cellulose has the advantage that it has a stable structure and can be imparted in a simple way with flame-retarding properties. The pore size of a web of cellulose is adjustable in a simple way during the manufacturing process, in particular by predetermining (selecting) the fiber diameter. Moreover, cellulose has an excellent cost-performance ratio.

In an advantageous embodiment, the composite filter medium web can have a support of plant-derived material, in particular cellulose, with a synthetic layer applied thereto, in particular a meltblown layer. By means of the three-dimensional storage structure of the meltblown layer, an excellent filtration performance is achieved and this increases the service life of the filter. Experiments have shown that the service life of filters with composite filter medium webs comprising meltblown layers are higher than the service life of filters with composite filter medium webs comprising the currently widely employed nanofiber coatings. Still, composite filter medium webs with nanofiber coating on conventional filter medium webs that do not comprise a composite of synthetic material and nonsynthetic material are superior with respect to filter technology and service life.

Advantageously, the composite filter medium web can be realized by means of lamination with adhesives or by means of calendering or ultrasonic fusing or welding of the components. Such composite filter medium webs fulfill also high requirements in regard to the composite quality that is needed in the manufacturing process for the corrugated filter medium web. In this way, local separations of the synthetic material from the non-synthetic material are prevented which would cause constriction of the passages between the flat and the corrugated filter medium webs. In particular in the inlet area of the passages it is important to realize a high composite quality in order to prevent separation that may cause areas of material to fold over and to close almost completely the corresponding passage. The composite and its quality are for this reason an important part of the composite filter medium web. Ultrasonic welding of meltblown and cellulose with a spot density of more than 5% of the web composite has been found to be a suitable connection or attachment method. Alternatively, in particular when using filter media that have been furnished with flame-retardant properties, preferably cellulose supports with flame-retardant properties, the composite may be produced also by means of lamination with a glue; this process is also well-suited. Lamination can be realized uniformly and across the entire surface in particular by using a spray adhesive or a fine embossment roller.

The average diameter of fibers of the synthetic material can be advantageously between 0.5 micrometers and 20 micrometers. Extensive tests have shown that in this way a very efficient three-dimensional storage structure with meltblown layers can be realized; in such structures the particles are not only deposited on the surface, as is the case for a filter medium that is coated with nanofibers. Compared particularly with a nanofiber coating, a greater layer thickness can be realized by means of a meltblown layer.

In a further advantageous embodiment, the synthetic material can have a unimodal distribution of the fiber diameters, and the layer thickness of the synthetic material can be approximately 20-fold to 300-fold the mean fiber diameter. Experiments have shown that a weight per surface area of the synthetic material of more than approximately 4 g/m$^2$ is particularly beneficial with respect to the filtration performance and the quality of the connection of the filter medium webs carried out by ultrasonic welding.

Advantageously, the synthetic material can have a bimodal distribution of the fiber diameters with two different mean fiber diameters, in particular a first mean fiber diameter of 3 micrometers to 20 micrometers and a second mean fiber diameter below 1 micrometer. In this way, the larger fibers with mean diameters of 3 micrometers to 20 micrometers can perform a support function. The smaller fibers with diameters of below 1 micrometer can contribute to a surface enlargement and thus an improved filtration performance.

In order to achieve a further improvement with respect to stability and filtration performance, a layer thickness of the synthetic material can be approximately between 25 times to 300 times the smallest mean fiber diameter, in particular between 25 micrometers and 300 micrometers.

In a further advantageous embodiment, a layer thickness of the non-synthetic material can be approximately between 150 micrometers and 660 micrometers. Such material thicknesses can be handled well during production. In this way, also pressure losses of the filter element can be maintained in a range that is optimal for filtration because for these layer thicknesses an optimal proportion of the inflow surface area can be covered by non-synthetic material.

The flat filter medium web and the corrugated filter medium web can be connected to each other advantageously along continuous or interrupted connecting lines. Preferably, the connecting lines extend on the corrugation peaks of the corrugated filter medium web. An advantage of corrugation peak welding is that by welding in the longitudinal direction no filter surface area is lost in the semi-finished product because the area of the peak of the corrugation where the flat and the corrugated filter medium webs are connected to each other are flowed through only to a minimal extent anyway. When connecting by ultrasonic welding, an interrupted welding seam has been found to be beneficial in particular. The interruptions in a welding line or seam have preferably a length of approximately 10 mm, respectively. The width of the welding lines or seams is preferably approximately 0.5 mm to 1 mm. The spacing between two neighboring welding lines at neighboring corrugation peaks is preferably approximately 6.1 mm to 7 mm. The connecting lines can be straight or curved.

In another advantageous embodiment, the passages that are delimited or bounded by the flat filter medium web and the corrugated filter medium web can be closed off at one end, respectively, in particular, sealed by a hotmelt or welded shut by means of ultrasonic welding. In this way, the fluid to be filtered is forced to pass through the passage walls. Hotmelt is a material or adhesive that is usually employed for sealing or gluing and that, at regular temperatures, is solid but upon heating is converted into a liquid melt. The closure or sealing by means of ultrasonic welding has the advantage that no additional adhesive is required.

In order to reduce the flammability of the compact filter, it may be advantageous when at least one of the filter medium webs has flame-retardant properties.

The technical object is solved furthermore in accordance with the invention with respect to the method in that at least one of the filter medium webs is configured of a composite of at least two components wherein at least one of the components is a synthetic material and at least one of the components is a non-synthetic material. The advantages that have been discussed supra in connection with the compact filter according to the invention apply also to the method of the invention.

In an advantageous embodiment of the method, for producing the composite filter medium web, a synthetic layer, in particular a meltblown layer, can be applied onto a support of plant-derived material, in particular cellulose.

The object is solved according to the invention moreover by a filter medium in which at least one of the filter medium webs is comprised of a composite of at least two components, wherein at least one of the components is a synthetic material and at least one of the components is a non-synthetic material. The aforementioned advantages of the compact filter according to the invention apply likewise to the filter medium.

Advantageously, the composite filter medium web can have a support of plant-derived material, in particular cellulose, with a synthetic layer, in particular a meltblown layer.

BRIEF DESCRIPTION OF THE DRAWING

Further advantages, features, and details of the invention result from the following description in which an embodiment of the invention will be explained in more detail with the aid of the drawing. A person of skill in the art will combine the features disclosed in combination in the drawing, the description, and the claims also expediently individually and combine them to other useful combinations.

In the Figures, same elements are identified with same reference characters.

DESCRIPTION OF THE PREFERRED EMBODIMENTS

Figure 1:
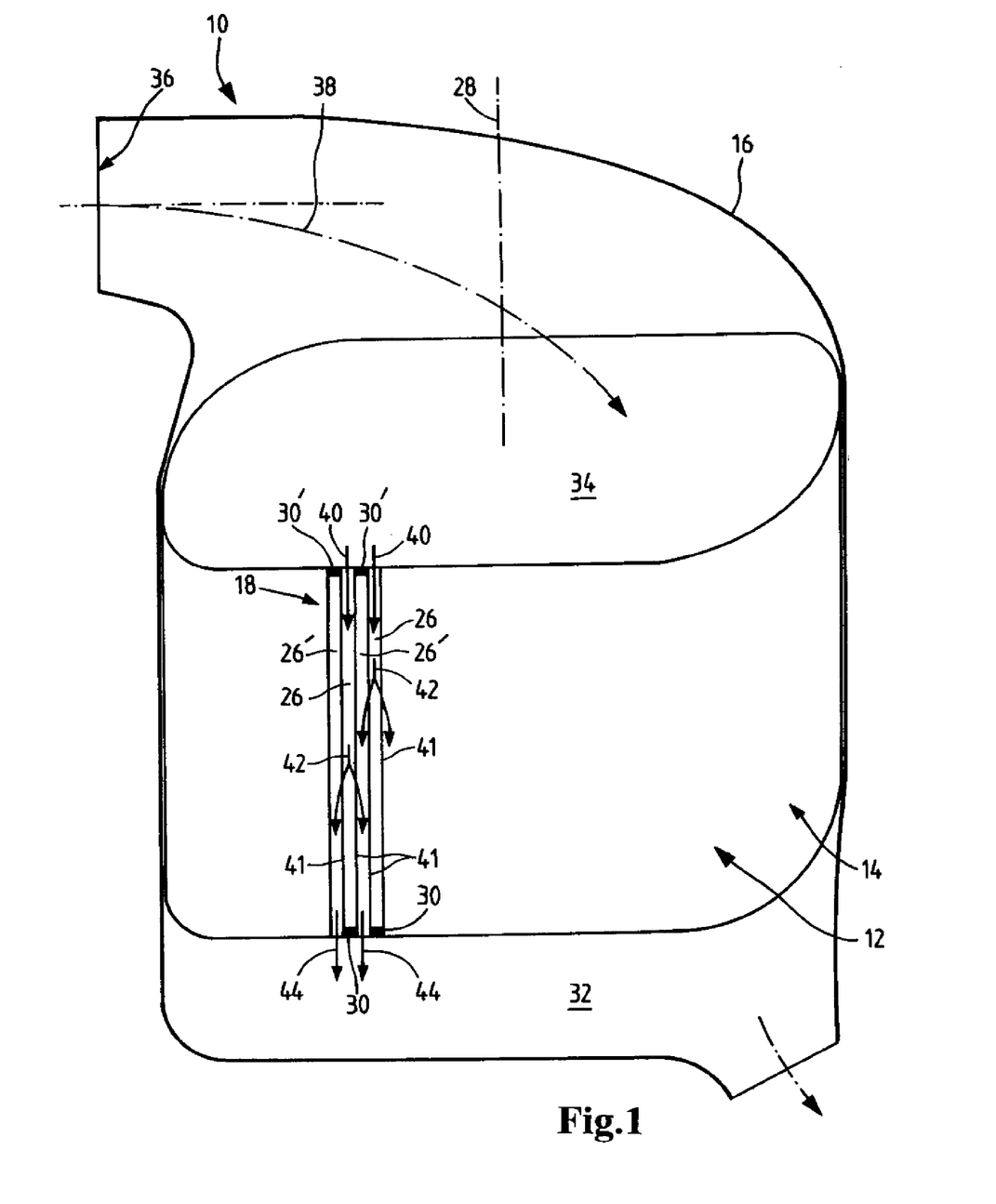
FIG. 1 shows schematically in a perspective illustration a compact filter with a compact filter element of a web-shaped filter medium comprised of a flat filter medium web and a corrugated filter medium web of cellulose supports with meltblown layers that are placed on top of each other and connected to each other.
Figure 2:
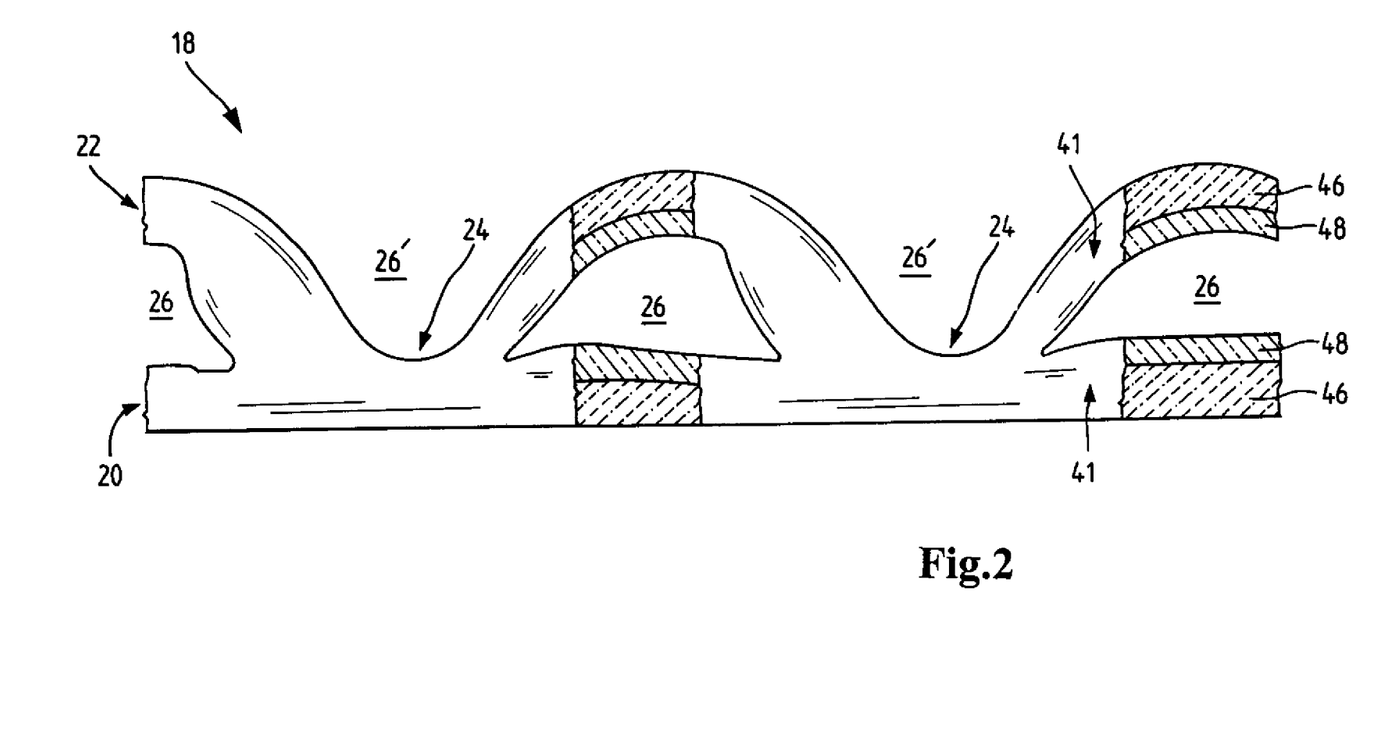
FIG. 2 shows schematically a section of the web-shaped filter medium of FIG. 1.
Figure 4:
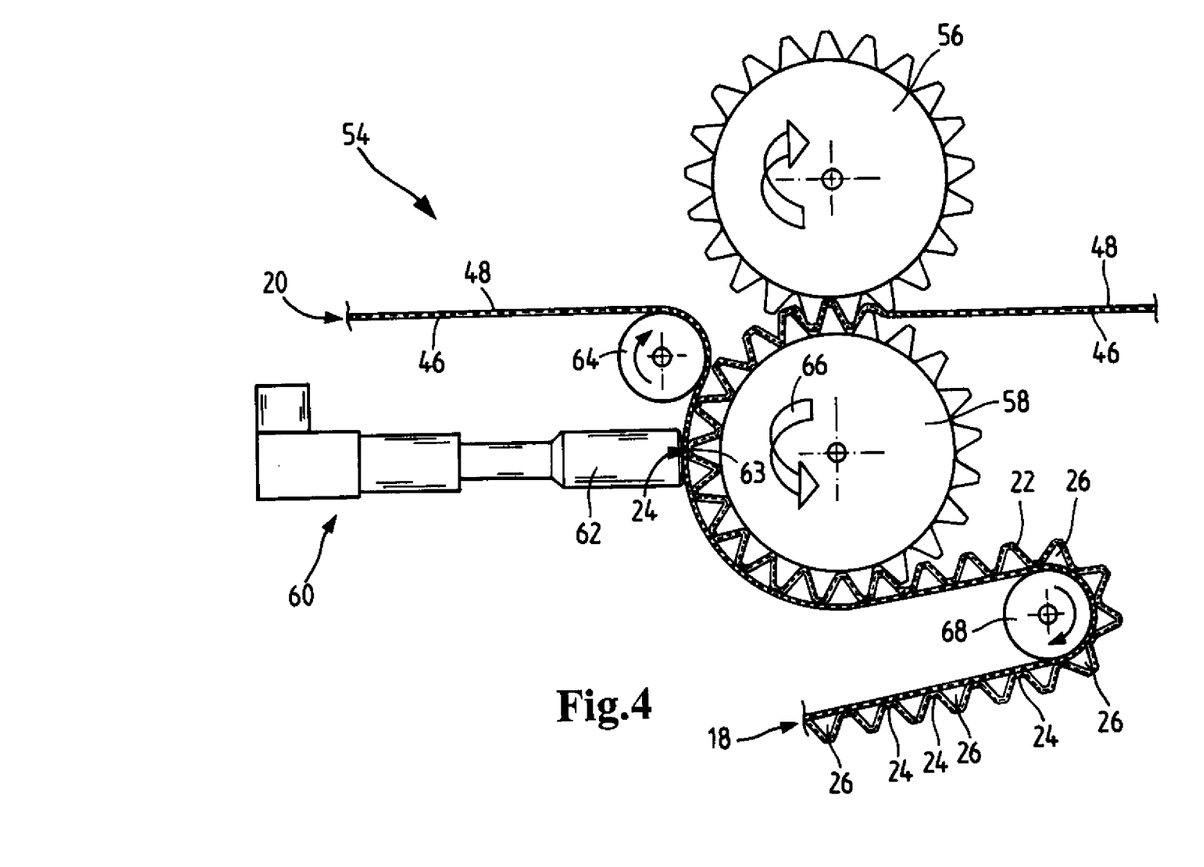
FIG. 4 shows a device for producing the web-shaped filter medium of the FIGS. 1 and 2.

FIG. 1 shows in a schematic perspective view a compact filter 10 that is embodied as a compact air filter for a motor vehicle. The compact filter 10 comprises a compact filter element 12 with a filter body 14 and a schematically indicated filter housing 16. The filter housing 16 is separable in a way not disclosed in detail in order to be able to exchange the compact filter element 12 in certain maintenance intervals. The filter body 14 is formed of a web-shaped filter medium 18. The web-shaped filter medium 18 is comprised of a flat filter medium web 20 and a corrugated filter medium web 22 that are connected to each other by means of ultrasonic welding along the corrugation peaks 24 of the corrugated filter medium web 22 along continuous connecting lines or curves. The configuration of the web-shaped filter medium 18 is illustrated in FIGS. 2 and 4. From such a semi-finished product the filter body 14 is formed by winding, stacking or folding in such a way that alternatingly a flat filter medium web 20 and a corrugated filter medium web 22 are placed on each other. The alternating and adjoining corrugated filter medium webs 22 and flat filter medium webs 20 create as a result of their layer configuration a plurality of gas passages 26 and 26' that extend parallel to a longitudinal axis 28 of the filter body 14. The filter body 14 is almost completely penetrated by gas passages 26 and 26'. However, for improved illustration, only a few gas passages 26 and 26' are illustrated in schematic longitudinal section illustration that is to be understood as a principle representation.

Neighboring gas passages 26 and 26' are seal-tightly closed alternatingly with hotmelt 30 and 30'. Each gas passage 26 at the inlet side that is closed off at its end that is adjoining the clean side (filtered side) 32 of the compact filter 10 with hotmelt 30 is located so as to neighbor an outlet gas passage 26' that is closed off at its end that is facing the raw side (unfiltered side) 34 of the compact filter 10 with hotmelt 30'. In an exemplary fashion, the gas passages 26' at the outlet side are the gas passages of the web-shaped filter medium 18. The inlet-side gas passages 26 are the gas passages that are formed by placing two neighboring layers of web-shaped filter medium 18 on each other. Also, the reverse situation is possible in which the inlet-side gas passages are the gas passages of the web-shaped filter medium.

The filter housing 16 has an inlet opening 36 through which the air that is laden with dust flows in the direction of arrow 38 to the raw side 34 of the compact filter element 12. Here, the dust-laden air enters the open gas passages 26 at the inlet side, as indicated by arrows 40. This inlet-side air stream is backed up or dammed up by the hotmelt 30 at the outlet side. The gas passages 26 at the inlet side and the outlet-side gas passages 26' are separated from each other by filter walls 41 of the filter medium webs 20 and 22. As a result of the aforementioned damming effect, the air stream at the inlet side passes in accordance with arrows 42 through the filter walls 41 into the outlet-side gas passages 26'. As air passes through, the dust particles are retained and the air exits as filtered air in accordance with arrows 44 from the outlet-side gas passages 26' and passe to the clean side 32. The inlet-side hotmelt 30' prevents the air from flowing back to the raw side 34.

The filter medium webs 20 and 22 are composite filter medium webs that each are comprised of a composite of a cellulose support 46 with a meltblown layer 48. The meltblown layer 48 is connected by means of lamination with an adhesive to the cellular support 46.

The meltblown layer 48 has a unimodal distribution of the fiber diameters with a mean fiber diameter between approximately 0.5 micrometers and 20 micrometers. The layer thickness of the meltblown support 48 is approximately between 25 times and 300 times that of the mean fiber diameter. The weight per surface area is greater than approximately 4 g/m².

The layer thickness of the cellulose support 46 is approximately between 150 micrometers and 660 micrometers.

The cellulose supports 46 are treated to be flame-retardant so that the filter medium webs 20 and 22 have flame-retardant properties.

The meltblown support 48 acts at the inflow side of the finished compact filter element 12 as a depth filter layer having a high separation action. In the manufacture by means of ultrasonic welding, the meltblown layer 48 functions also as an adhesive for fixation of the corrugated filter medium web 22 on the flat filter medium web 20.

Figure 3:
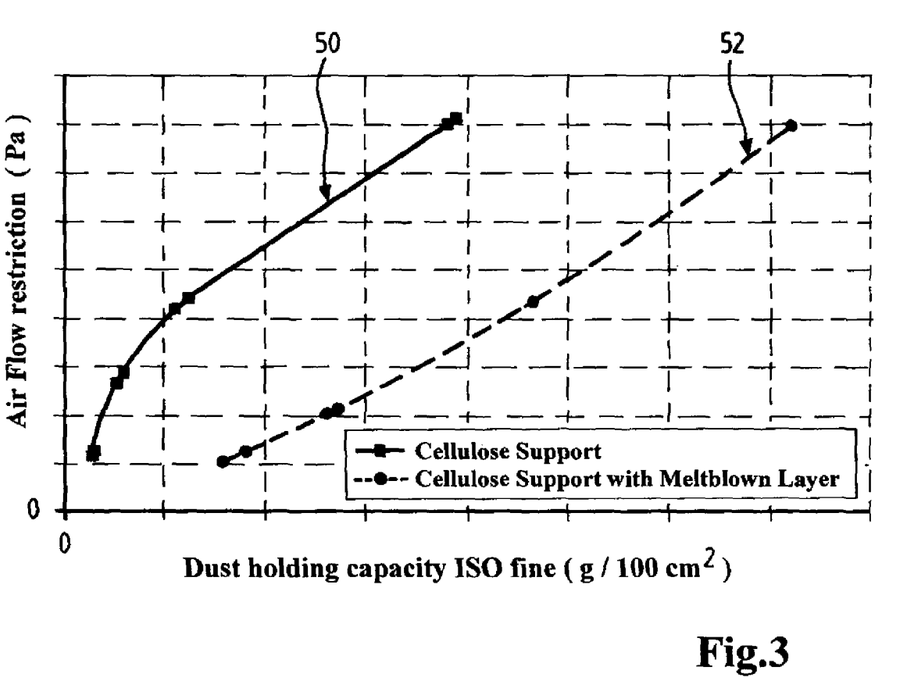
FIG. 3 shows the pressure course of the filter medium of FIG. 1 when loaded with test dust ISO in comparison to a pressure course of a filter medium with a cellulose support without meltblown layers.

When operating the compact filter element 12, the meltblown layer 48 interacts with the cellulose support 46 for filtering the air. In FIG. 3, in an exemplary fashion, comparative pressure courses of cellulose supports 46 with and without meltblown layers 48 are shown when loaded with test dust ISO (International Organization for Standardization). In the coordinate system the dust load (dust holding capacity) of the filter medium webs 20 and 22 is illustrated on a linear scale in the direction of the horizontal axis and the increase in pressure loss (air flow restriction) between the raw side and the clean side of the filter medium 18 is illustrated on a linear scale in the direction of the vertical axis. The curve 50, in FIG. 3 to the left, corresponds to the pressure course when using filter medium webs with cellulose supports without meltblown layer. The curve 52, in FIG. 3 to the right, corresponds to the pressure course when using cellulose supports 46 with meltblown layers 48.

When loading with test dust ISO, in the cellulose supports 46 with meltblown layers 48 a pressure increase due to holding of dust occurs later than in case of cellulose supports 46 without meltblown layer 48. The pressure increase in the cellulose supports 46 with meltblown layers 48 is moreover less than in cellulose supports without meltblown layers.

In case of the cellulose supports 46 without meltblown layer 48 the course of the pressure increase becomes more flat as soon as a dust cake has formed on the surface; the further pressure increase is caused primarily by the growth of the dust layer on the surface of the cellulose supports 46.

In the cellulose supports 46 with meltblown layer 48, the meltblown layer 48 retains most of the dust particles so that embedding of dust particles in the cellulose support 46 is correspondingly reduced. The risk of blocking of fine pores of the dense cellulose support 46 is reduced in this way. This leads from the beginning to a significantly more flat course of the pressure increase as compared to the cellulose supports 46 without meltblown layer 48. This has, as a whole, an advantageous effect on the filtration action. Moreover, because of the meltblown layer 48 also the degree of separation for dust is improved; this is also advantageous.

Figure 3A:
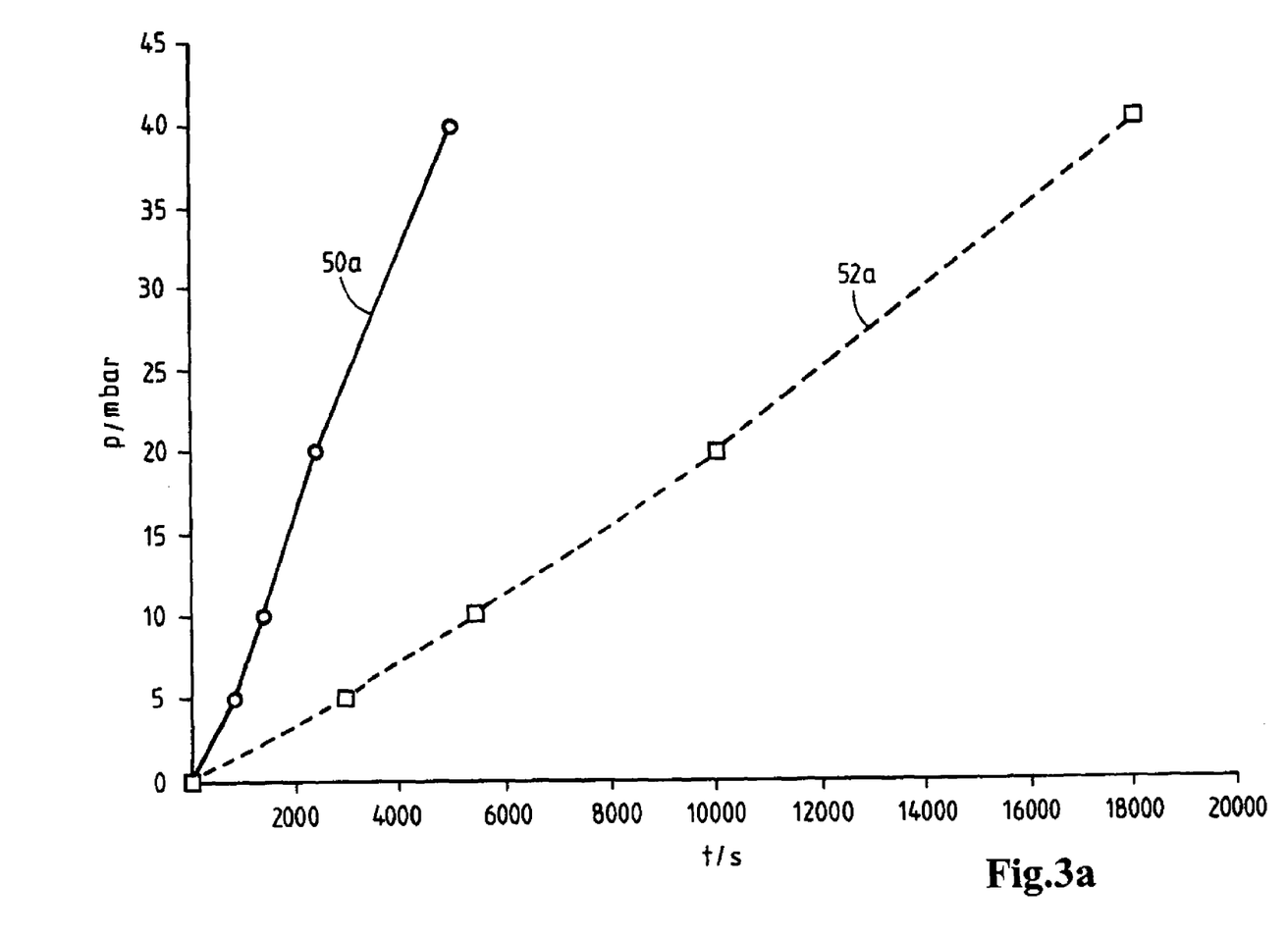
FIG. 3a shows the pressure course for the compact filter element of FIG. 1 when loaded with soot in comparison to a pressure course of a compact filter element with a cellulose support without meltblown layers.

In FIG. 3a, in an exemplary fashion comparative pressure courses of cellulose supports 46 with and without meltblown layers 48 when loaded with soot are shown. In contrast to the situation illustrated in FIG. 3, the increase of pressure loss (air flow restriction) between the raw side 34 and the clean side 32 of the compact filter element 12 is shown. As illustrated in FIG. 3, in the coordinate system the pressure loss increase is shown on a linear scale in the direction of the vertical axis. In contrast to FIG. 3, in the direction of the horizontal axis the soot retention service life of the filter is illustrated on a linear scale. The soot has a mean particle size of 95 nm and is comparable to the soot particles (Diesel particulate matter) that is produced by Diesel engines. The curve 50a, in FIG. 3a to the left, corresponds to the pressure loss when using filter medium webs with cellulose supports without meltblown layer. The curve 52a to the right corresponds to the pressure course when using cellulose supports 46 with meltblown layers 48. In other respects, the explanations provided above in connection with FIG. 3 apply likewise to the pressure courses of FIG. 3a.

In FIG. 4, a device 54 for producing the web-shaped filter medium 18 is illustrated. The flat filter medium web 20 and the corrugated filter medium web 22 that is initially also flat are made available preferably in the form of endless webs. The corrugation of the corrugated filter medium web 22 is realized in an embossment area by a pair of corrugation rollers 56 and 58 which rotate in opposite directions. The guiding corrugation roller 58, shown in FIG. 4 at the bottom, guides the corrugated filter medium web 22 after the embossment has been carried out about approximately half its circumference. The meltblown layer 48 is located at the side of the corrugated filter medium web that is facing away from the guiding corrugation roller 58.

The corrugation rollers 56 and 58 are similar with respect to their shape to gear wheels but are much wider. The corrugation rollers 56 and 58 are provided with meshing curves for generating the corrugation. The curves on the corrugation rollers determine the shape and the height of the corrugation of the corrugated filter medium web 22.

In the rotation direction (arrow 66) of the guiding corrugation roller 58 behind the embossment area there is an ultrasonic welding unit 60. The ultrasonic welding unit 60 comprises an ultrasonic sonotrode 62 which engages upon rotation of the guiding corrugation roller 58 the facing curve peak 63 of the guiding corrugation roller 58.

The flat filter medium web 20 is supplied by deflection roller 64 to the guiding corrugation roller 58 and is placed in the rotational direction 66 of the guiding corrugation roller 58 in front of the ultrasonic sonotrode 62 onto the corrugated filter medium web 22. The meltblown support 48 is facing the flat filter medium web 20 of the corrugated filter medium web 22.

The filter medium webs 20 and 22 that are contacting each other are entrained by the guiding corrugation roller 58. The corrugation peak 24 of the corrugated filter medium web 22 that is resting on the curve peak 63 facing the ultrasonic sonotrode 62 is welded to the flat filter medium web 20. The ultrasonic sonotrode 62 hammers for this purpose with ultrasonic frequency onto the curve peak 63. Because of the high temperatures that are created thereby, the areas of the filter medium webs 20 and 22 that are located between the ultrasonic sonotrode 62 and the curve peak 63 will heat up locally so that the meltblown layers 48 melt. The meltblown layers 48 penetrate each other and into the matrix of the two cellulose supports 46. As a result of the subsequent solidification, the meltblown layers 48 connect the filter medium webs 20 and 22 fixedly with each other.

The ultrasonic sonotrode 62 is designed such that it welds the filter medium webs 20 and 22 along a continuous connecting line on the curve peak 63 of the guiding corrugation roller 58. The connecting line extends in the illustrated embodiment parallel to the axis of rotation of the guiding corrugation roller 58.

In the rotational direction 66 of the guiding corrugation roller 58 behind the ultrasonic sonotrode 62 the web-shaped filter medium 18 is supplied by means of a deflection roller 68 to a further processing unit, not illustrated. With the processing unit, the gas passages 26 of the web-shaped filter medium 18 are seal-tightly closed off at one side by the hotmelt 30. Sealing of the gas passages 26' with hotmelt 30' at the other end is then realized later on upon designing the filter body 14.

The manufacture of the compact filter 10 as a whole is disclosed in the following.

The cellulose support webs 46 are furnished with flame-retardant properties.

The meltblown layers 48 are applied to the cellulose support webs 46.

From the thus manufactured filter medium webs 20 and 22, subsequently, in the way described above, the web-shaped filter medium 18 is produced with the device 54.

From the web-shaped filter medium 18 the filter body 14 of the compact filter element 12 is made, preferably by winding or stacking. In this context, the gas passages 26' are also closed or sealed at one side with the hotmelt 30'. In addition, flat hotmelt adhesive traces can be applied transversely to the extension of the gas passages 26 and 26' that additionally hold together the filter body 14. For embodying the compact filter element 12, preferably a crosslinking, in particular chemically post-crosslinking, hotmelt (reactive adhesive) can be used, in particular as hotmelt 30'. A crosslinking hotmelt has the advantage that after completed crosslinking (reaction) the hotmelt will no longer soften at higher temperatures. The use of a reactive adhesive in combination with ultrasonic welding advantageously leads to a filter body 14 that is stable even at higher temperatures. In this way, even at higher temperatures, in particular temperatures greater than 80 degrees Celsius, no drastic softening of the hotmelt (adhesive) may occur which might lead to telescoping of the filter body 14 and to malfunctioning of the filter body.

The compact filter element 12 is provided with a seal. For this purpose, polyurethane (PUR) is molded about the compact filter element 12. Alternatively, the compact filter element 12 can be arranged in a cage with a seal.

The compact filter element 12 is inserted into the filter housing 16.

In the above described embodiment of a compact filter 10 and a method for producing such a filter, the following modifications are conceivable inter alia.

The invention is not limited to use in connection with compact filters 10 for air filtration. Instead, it can also be used for filtration of other gasses or liquid fluids, for example, water, oil or fuel.

The invention can be used in trucks or passenger vehicles or other motor vehicles. Also, the use in industry, for example, in industrial motors is possible.

Instead of embodying both filter medium webs 20, 22 as a composite as described, it is possible to provide only the flat filter medium web 20 or the corrugated filter medium web 20 as a composite of a synthetic material and a non-synthetic material.

The filter medium webs 20, 22 can also be comprised of a composite of more than two components.

Instead of cellulose, also a different type of non-synthetic material, for example, plant-derived material, can be used.

Instead of the meltblown layer 48, also a different synthetic layer, for example, a nanofiber coating can be used.

Instead of using lamination, the composite of the meltblown layer 48 and the cellulose support 46 can be made also in a different way, for example, by means of calendering, preferably hot calendering, or ultrasonic welding of the components. Ultrasonic welding of the components can be realized preferably with a spot density of more than 5% of the composite surface.

Instead of the unimodal distribution of the fiber diameter, the meltblown layer 48 can also have a bimodal distribution of the fiber diameters with at least two different mean fiber diameters, for example, of approximately 3 micrometers to 20 micrometers and below approximately 1 micrometer. In this case, a layer thickness of the synthetic material can be between 25 times and 300 times of the smallest mean fiber diameter, for example, between 25 micrometer and 300 micrometer.

In the unimodal as well as in the bimodal distribution larger or smaller fiber diameters can be used. Also, the weight per surface area of the meltblown layer 48 in the unimodal distribution of the fiber diameter can be preferably less than approximately 4 g/m$^2$.

The flat filter medium web 20 and the corrugated filter medium web 22, instead of being connected to each other along continuous connecting lines, can also be connected to each other along interrupted connecting lines. For example, for every 10 mm of length, a 3 mm wide weld seam can be realized preferably at the corrugation peaks 24 of the corrugated filter medium web 22. For this purpose, an especially designed ultrasonic sonotrode can be employed.

Instead of being closed off by means of hotmelt 30, 30', the gas passages 26, 26' can also be closed off (sealed) in other ways. For example, the gas passages 26, 26' can also be welded shut by means of ultrasonic welding. In this way, a separate adhesive is not required because the meltblown layers 48 that are present anyway can be used.

Instead of both filter medium webs 20, 22 being provided with flame-retardant properties, one or none of the filter medium webs can be furnished with flame-retardant properties.

The corrugation rollers 56 and 58, instead of having a straight meshing arrangement, can also have a slanted meshing arrangement. In this case, the connecting lines extend accordingly at a slant relative to the axis of rotation of the guiding corrugation roller.

While specific embodiments of the invention have been shown and described in detail to illustrate the inventive principles, it will be understood that the invention may be embodied otherwise without departing from such principles.

What is claimed is:

1. A compact filter comprising:
   a compact filter element for exchangeable use in a filter housing; said compact filter element comprising a filter body of a web-shaped filter medium;
   said web-shaped filter medium comprising at least one flat filter medium web and one corrugated filter medium web placed onto each other and at least partially connected to each other by ultrasonic welding;
   wherein at least one of said flat and corrugated filter medium webs is comprised of a composite filter medium web of at least two components, wherein at least one of said components is a synthetic material and at least one of said components is a non-synthetic material;
   wherein said synthetic material comprises fibers and said fibers have a mean fiber diameter that is between 0.5 micrometer and 20 micrometer;
   wherein said synthetic material has a bimodal distribution of fiber diameters of said fibers;
   wherein a first mean fiber diameter and a second mean fiber diameter that is smaller than said first mean fiber diameter;
   wherein a layer thickness of said synthetic material is approximately between 25 times and 300 times that of a smallest mean fiber diameter.

2. The compact filter according to claim 1, wherein said plant-derived material is cellulose.

3. The compact filter according to claim 1, wherein said composite filter medium web is made by lamination with adhesive, by calendering, or by ultrasonic welding of said at least two components.

4. The compact filter according to claim 1, wherein said first mean fiber diameter is 3 micrometers to 20 micrometers and
said second mean fiber diameter is below 1 micrometer.

5. The compact filter according to claim 1, wherein said layer thickness is between 25 micrometers and 300 micrometers.

6. The compact filter according to claim 1, wherein a layer thickness of said non-synthetic material is approximately between 150 micrometers and 660 micrometers.

7. The compact filter according to claim 1, wherein said flat and corrugated filter medium webs are connected to each other along a continuous connecting line or an interrupted connecting line.

8. The compact filter according to claim 1, wherein said flat and corrugated filter medium webs filter medium web define channels and
said channels are sealed at one end, respectively.

9. The compact filter according to claim 8, wherein said one end of said channels is sealed by a hotmelt or sealed by welding shut by ultrasonic welding.

10. The compact filter according to claim 1, wherein at least one of said flat and corrugated filter medium webs has flame-retardant properties.

* * * * *